(12) United States Patent
Larsen et al.

(10) Patent No.: US 9,450,415 B2
(45) Date of Patent: Sep. 20, 2016

(54) SYSTEM AND METHOD FOR CONTROLLING A DUAL-FED INDUCTION GENERATOR IN RESPONSE TO HIGH-VOLTAGE GRID EVENTS

(75) Inventors: Einar Vaughn Larsen, Charlton, NY (US); Anthony Michael Klodowski, Hardy, VA (US); Sidney Allen Barker, Tourtville, VA (US)

(73) Assignee: General Electric Company, Schenectady, NY (US)

( * ) Notice: Subject to any disclaimer, the term of this patent is extended or adjusted under 35 U.S.C. 154(b) by 871 days.

(21) Appl. No.: 13/600,730

(22) Filed: Aug. 31, 2012

(65) Prior Publication Data

US 2014/0062424 A1    Mar. 6, 2014

(51) Int. Cl.
| H02J 1/00 | (2006.01) |
| H02J 3/00 | (2006.01) |
| H02J 3/38 | (2006.01) |
| H02P 9/00 | (2006.01) |
| H02P 9/10 | (2006.01) |

(52) U.S. Cl.
CPC .............. *H02J 3/386* (2013.01); *H02P 9/007* (2013.01); *H02P 9/10* (2013.01); *Y02E 10/763* (2013.01)

(58) Field of Classification Search
CPC ........ Y02E 10/763; H02J 3/386; H02P 9/10; H02P 9/007
USPC ............................................. 307/82; 325/82
See application file for complete search history.

(56) References Cited

U.S. PATENT DOCUMENTS

| 7,408,268 | B1 | 8/2008 | Nocentini et al. | |
| RE43,698 | E * | 10/2012 | Hudson | 290/44 |
| 2006/0192390 | A1* | 8/2006 | Juanarena Saragueta et al. | 290/44 |
| 2009/0121483 | A1* | 5/2009 | Xiong et al. | 290/44 |
| 2011/0101689 | A1* | 5/2011 | Larsen et al. | 290/44 |
| 2013/0234435 | A1* | 9/2013 | Wagoner et al. | 290/44 |

OTHER PUBLICATIONS

Chuttchaval Jereputra and Prasad N. Enjeti, "Development of a Robust Anti-Islanding Algorithm for Utility Interconnection of Distributed Fuel Cell Powered Generation", IEEE Transactions on Power Electronics, vol. 19, No. 5, pp. 1163-1170, Sep. 2004.

* cited by examiner

*Primary Examiner* — Hal Kaplan
*Assistant Examiner* — Esayas Yeshaw
(74) *Attorney, Agent, or Firm* — Dority & Manning, P.A.

(57) ABSTRACT

In one aspect, a method for controlling a dual-fed induction generator (DFIG) during a high-voltage grid event is provided. The method includes setting, by a controller, an output of a closed-loop portion of a rotor current regulator to a fixed value such that a predictive feed-forward path sets an internal voltage for the DFIG; and detecting, by the controller, a condition of high dc voltage on a dc link or a condition predictive of high dc voltage on the dc link, and in response reduce a rotor torque producing current command to approximately zero, wherein the dc link connects a line-side converter connected to a system bus and a rotor-side converter connected to a rotor of the DFIG.

20 Claims, 11 Drawing Sheets

SYSTEM AND METHOD FOR CONTROLLING A DUAL-FED INDUCTION GENERATOR IN RESPONSE TO HIGH-VOLTAGE GRID EVENTS

FIELD OF THE INVENTION

The present subject matter relates generally to electrical machines and, more particularly, to a system and method for controlling a dual-fed induction generator (DFIG) in response to high-voltage grid events.

BACKGROUND OF THE INVENTION

Generally, a wind turbine generator includes a turbine that has a rotor that includes a rotatable hub assembly having multiple blades. The blades transform mechanical wind energy into a mechanical rotational torque that drives one or more generators via the rotor. The generators are generally, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbine generators also exist. The rotor, generator, gearbox and other components are typically mounted within a housing, or nacelle, that is positioned on top of a base that may be a truss or tubular tower. In some instances, one or more wind turbines that are situated relatively close together geographically can form a wind park or wind farm.

Some wind turbine generator configurations include doubly fed induction generators (DFIGs). Such configurations may also include power converters that are used to transmit generator excitation power to a wound generator rotor from one of the connections to the electric utility grid connection. Moreover, such converters, in conjunction with the DFIG, also transmit electric power between the utility grid and the generator as well as transmit generator excitation power to a wound generator rotor from one of the connections to the electric utility grid connection. DFIGs are used in wind turbines to permit variable-speed operation with minimum power-electronic power rating. These machines operate at speeds below synchronous (sub-synchronous) at low power, and at speeds above synchronous (super-synchronous) at high power. These wind turbines are connected to power grids, often operating in parallel with many other turbines on the same electrical collector system. The power grids can have many types of disturbances, some of which result in high-voltage conditions on the grid and on the wind turbine electrical systems. These disturbances can include: (1) remote events that can cause the voltage on the entire high-voltage grid to increase well above normal with gradual reduction back to normal; (2) local grid faults that can cause voltage at the wind turbines to be depressed, followed by sudden removal of the faulted circuit element. The sudden removal my cause an overshoot in voltage in a wind park until the wind turbines react to the new grid condition and regain control to bring the turbine back to normal operation into the portion of the grid that remains after fault clearing; or (3) local grid faults that, upon clearing, leave the wind plant with no remaining connection to the grid, but still with the wind turbines connected to the cables and lines of the wind plant and possibly a portion of the transmission grid. This can be considered an "islanded" condition for the wind park that is characterized by potentially significant deviations in voltage and frequency. This condition is not to be confused with other usages of the term "islanding", where the intent is to ensure safety of maintenance personnel.

Each of the above-described events poses a potential for damage to the wind turbine electrical system due to high voltages within that system that exceed equipment capability. It is desirable for the wind turbine to ride through the grid events, both low-voltage and high-voltage, when the grid remains partially intact after clearing the grid fault. When the grid becomes open-circuited after clearing the fault, then it is desirable that the wind turbines continue operating without damage and eventually shut down based on inability to transfer power. In the latter situation, there is usually no time requirement for shutdown when the turbine is part of a wind park connected to a transmission grid. For distribution applications, local codes and regulations may require shutdown within a specified time, typically several seconds.

Accordingly, an improved system and/or method that respond to a high-voltage grid event on an electrical system connected with one or more DFIGs would be welcomed in the technology.

BRIEF DESCRIPTION OF THE INVENTION

In one aspect, a method for controlling a dual-fed induction generator (DFIG) in response to a high-voltage grid event is provided. The method includes setting, by a controller, an output of a closed-loop portion of a rotor current regulator to a fixed value such that a predictive feed-forward path sets an internal voltage for the DFIG; and detecting, by the controller, a condition of high dc voltage on a dc link or a condition predictive of high dc voltage on the dc link, and in response reduce a rotor torque producing current command to approximately zero, wherein the dc link connects a line-side converter connected to a system bus and a rotor-side converter connected to a rotor of the DFIG.

In another aspect, a system for controlling a dual-fed induction generator (DFIG) in response to a high-voltage grid event is provided. The system includes a controller, wherein the controller is configured to detect a condition of high grid voltage; a line-side converter connected to a system bus; and a rotor-side converter connected to a rotor of the DFIG, wherein the line-side converter and the rotor-side converter are connected by a direct current (dc) link, wherein the line-side converter and the rotor-side converter are communicatively coupled with the controller, the controller further comprising a rotor current regulator, wherein in response to the detected condition of high grid voltage, an output of a closed-loop portion of the rotor current regulator is set to a fixed value such that a predictive feed-forward path sets an internal voltage for the DFIG, in response to the detected condition of high grid voltage, the controller further configured to: detect a condition of high dc voltage on the dc link, or a condition predictive of high dc voltage on the dc link, and in response reduce a rotor torque producing current command to approximately zero.

In yet another aspect, a system for controlling a dual-fed induction generator (DFIG) in response to a high-voltage grid event is provided. The system includes one or more dual-fed induction generators (DFIGs) connected to an alternating current (ac) electric power system, wherein the ac electric power system is configured to transmit at least one phase of electrical power to the one or more DFIGs or to receive at least one phase of electrical power from the one or more DFIGs; and a control system, wherein the control system is electrically coupled to at least a portion of the ac electric power system and at least a portion of the control system is coupled in electronic data communication with at least a portion of the one or more DFIGs, and wherein the control system comprises a controller and the controller is configured to: detect a grid fault on an the ac electric power system, wherein the controller configured to detect the grid fault on the ac electric system comprises the controller configured to detect whether the grid fault comprises a high voltage grid event; in response to the detected high-voltage grid event, the controller is further configured to: set an output of a closed-loop portion of a rotor current regulator to a fixed value such that a predictive feed-forward path sets an internal voltage for the DFIG; detect a condition of high dc voltage on a dc link or a condition predictive of high dc voltage on the dc link, and in response reduce a rotor torque producing current command to approximately zero, wherein the dc link connects a line-side converter connected to a system bus and a rotor-side converter connected to a rotor of the DFIG; and lower a magnitude of the internal voltage on the DFIG.

In yet another aspect, a method for controlling wind turbine electrical components when shutting down a system due to certain abnormal conditions having occurred that are associated with a dual-fed induction generator (DFIG) is described. The method includes issuing, by a controller, a command to open a wind turbine circuit breaker. This command is issued a command to open a wind turbine circuit breaker as soon as the abnormal conditions that require a shutdown occur. The method further includes continuing to gate electronic switches that comprise a line converter and a rotor converter during and after issuing the command to open the wind turbine circuit breaker; and stopping the gating of the electronic switches that comprise the line converter and the rotor converter when it is determined that the wind turbine circuit breaker has opened.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of embodiments of the present invention, including the best mode thereof, directed to one of ordinary skill in the art, is set forth in the specification, which makes reference to the appended figures, in which.

DETAILED DESCRIPTION OF THE INVENTION

Before the present methods and systems are disclosed and described, it is to be understood that the methods and systems are not limited to specific synthetic methods, specific components, or to particular compositions. It is also to be understood that the terminology used herein is for describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Generally disclosed herein are systems and methods of responding to a high-voltage grid event on an electrical system connected with one or more DFIGs.

Figure 1:
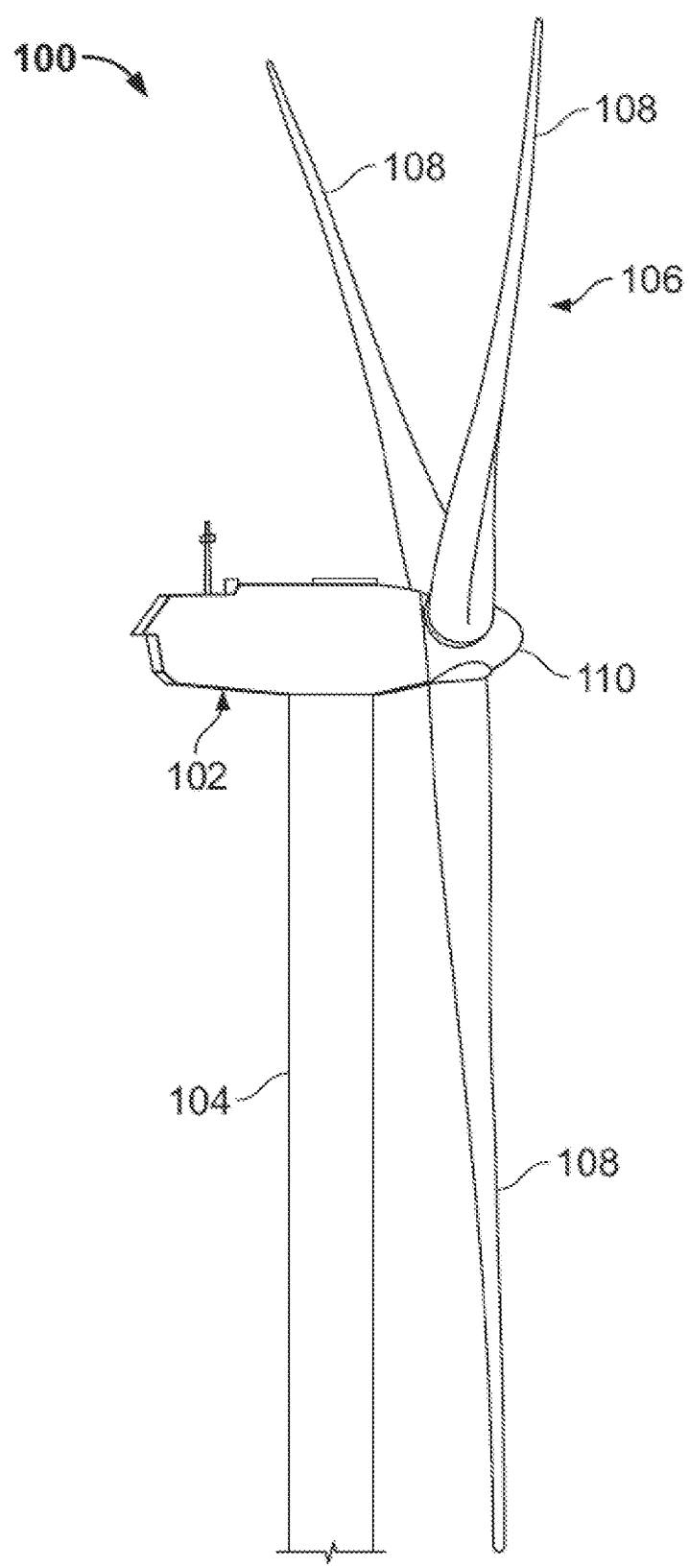
FIG. 1 is a schematic view of an exemplary wind turbine generator.

FIG. 1 is a schematic view of an exemplary wind turbine generator 100. The wind turbine 100 includes a nacelle 102 housing a generator (not shown in FIG. 1). Nacelle 102 is mounted on a tower 104 (a portion of tower 104 being shown in FIG. 1). Tower 104 may be any height that facilitates operation of wind turbine 100 as described herein. Wind turbine 100 also includes a rotor 106 that includes three rotor blades 108 attached to a rotating hub 110. Alternatively, wind turbine 100 includes any number of blades 108 that facilitate operation of wind turbine 100 as described herein. In the exemplary embodiment, wind turbine 100 includes a gearbox (not shown in FIG. 1) rotatingly coupled to rotor 106 and a generator (not shown in FIG. 1).

Figure 2:
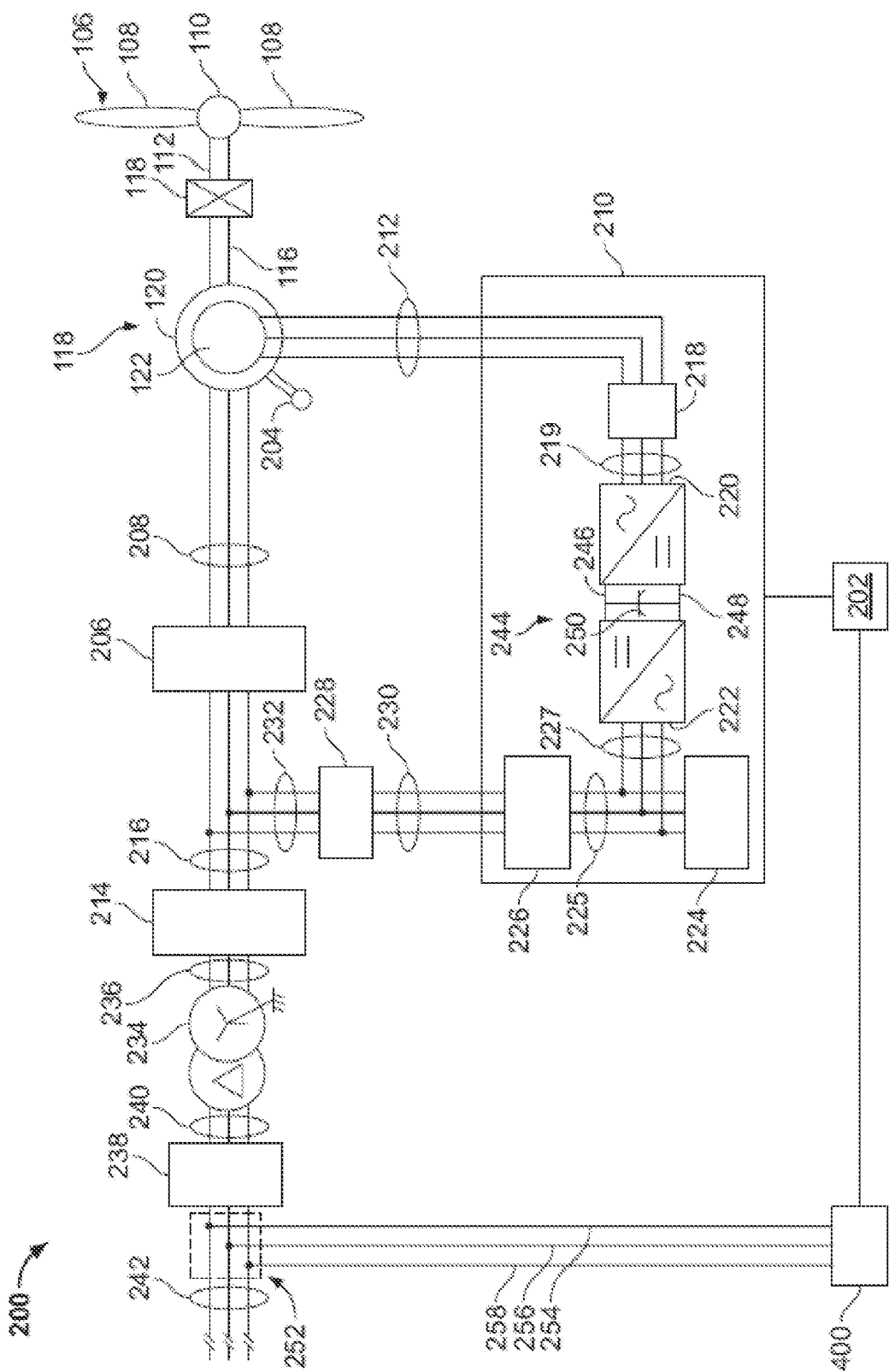
FIG. 2 is a schematic view of an exemplary electrical and control system that may be used with the wind turbine generator shown in FIG. 1.

FIG. 2 is a schematic view of an exemplary electrical and control system 200 that may be used with wind turbine generator 100 (shown in FIG. 1). Rotor 106 includes plurality of rotor blades 108 coupled to rotating hub 110. Rotor 106 also includes a low-speed shaft 112 rotatably coupled to hub 110. Low-speed shaft is coupled to a step-up gearbox 114. Gearbox 114 is configured to step up the rotational speed of low-speed shaft 112 and transfer that speed to a high-speed shaft 116. In the exemplary embodiment, gearbox 114 can have a step-up ratio of approximately 70:1. For example, low-speed shaft 112 rotating at approximately 20 revolutions per minute (20) coupled to gearbox 114 with an approximately 70:1 step-up ratio generates a high-speed shaft 116 speed of approximately 1400 rpm. Alternatively, gearbox 114 has any step-up ratio that facilitates operation of wind turbine 100 as described herein. Also, alternatively, wind turbine 100 includes a direct-drive generator wherein a generator rotor (not shown in FIG. 1) is rotatingly coupled to rotor 106 without any intervening gearbox.

High-speed shaft 116 is rotatably coupled to generator 118. In the exemplary embodiment, generator 118 is a wound rotor, synchronous, 60 Hz, three-phase, doubly-fed induction generator (DFIG) that includes a generator stator 120 magnetically coupled to a generator rotor 122. Alternatively, generator 118 is any generator of any number of phases that facilitates operation of wind turbine 100 as described herein.

Electrical and control system 200 includes a controller 202. Controller 202 includes at least one processor and a memory, at least one processor input channel, at least one processor output channel, and may include at least one computer (none shown in FIG. 2). As used herein, the term computer is not limited to just those integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, a floppy disk, a compact disc-read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) may be, but not be limited to, computer peripherals associated with an operator interface such as a mouse and a keyboard (neither shown in FIG. 2). Alternatively, other computer peripherals may also be used that may include, for example, but not be limited to, a scanner (not shown in FIG. 2). Furthermore, in the exemplary embodiment, additional output channels may include, but not be limited to, an operator interface monitor (not shown in FIG. 2).

Processors for controller 202 process information transmitted from a plurality of electrical and electronic devices that may include, but not be limited to, speed and power transducers, current transformers and/or current transducers, breaker position indicators, potential transformers and/or voltage transducers, and the like. RAM and storage device store and transfer information and instructions to be executed by the processor. RAM and storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Electrical and control system 200 also includes generator rotor tachometer 204 that is coupled in electronic data communication with generator 118 and controller 202. Generator stator 120 is electrically coupled to a stator synchronizing switch 206 via a stator bus 208. In the exemplary embodiment, to facilitate the DFIG configuration, generator rotor 122 is electrically coupled to a bi-directional power conversion assembly 210 via a rotor bus 212. Alternatively, system 200 is configured as a full power conversion system (not shown) known in the art, wherein a full power conversion assembly (not shown) that is similar in design and operation to assembly 210 is electrically coupled to stator 120 and such full power conversion assembly facilitates channeling electrical power between stator 120 and an electric power transmission and distribution grid (not shown). Stator bus 208 transmits three-phase power from stator 120 and rotor bus 212 transmits three-phase power from rotor 122 to assembly 210. Stator synchronizing switch 206 is electrically coupled to a main transformer circuit breaker 214 via a system bus 216.

Assembly 210 includes a rotor filter 218 that is electrically coupled to rotor 122 via rotor bus 212. Rotor filter 218 is electrically coupled to a rotor-side, bi-directional power converter 220 via a rotor filter bus 219. Converter 220 is electrically coupled to a line-side, bi-directional power converter 222. Converters 220 and 222 are substantially identical. Power converter 222 is electrically coupled to a line filter 224 and a line contactor 226 via a line-side power converter bus 223 and a line bus 225. In the exemplary embodiment, converters 220 and 222 are configured in a three-phase, pulse width modulation (PWM) configuration including insulated gate bipolar transistor (IGBT) switching devices (not shown in FIG. 2) that "fire" as is known in the art. Alternatively, converters 220 and 222 have any configuration using any switching devices that facilitate operation of system 200 as described herein. Assembly 210 is coupled in electronic data communication with controller 202 to control the operation of converters 220 and 222.

Line contactor 226 is electrically coupled to a conversion circuit breaker 228 via a conversion circuit breaker bus 230. Circuit breaker 228 is also electrically coupled to system circuit breaker 214 via system bus 216 and connection bus 232. System circuit breaker 214 is electrically coupled to an electric power main transformer 234 via a generator-side bus 236. Main transformer 234 is electrically coupled to a grid circuit breaker 238 via a breaker-side bus 240. Grid breaker 238 is connected to an electric power transmission and distribution grid via a grid bus 242.

In the exemplary embodiment, converters 220 and 222 are coupled in electrical communication with each other via a single direct current (DC) link 244. Alternatively, converters 220 and 222 are electrically coupled via individual and separate DC links (not shown in FIG. 2). DC link 244 includes a positive rail 246, a negative rail 248, and at least one capacitor 250 coupled therebetween. Alternatively, capacitor 250 is one or more capacitors configured in series or in parallel between rails 246 and 248.

System 200 can further include a phase-locked loop (PLL) regulator 400 that is configured to receive a plurality of voltage measurement signals from a plurality of voltage transducers 252. In the exemplary embodiment, each of three voltage transducers 252 are electrically coupled to each one of the three phases of bus 242. Alternatively, voltage transducers 252 are electrically coupled to system bus 216. Also, alternatively, voltage transducers 252 are electrically coupled to any portion of system 200 that facilitates operation of system 200 as described herein. PLL regulator 400 is coupled in electronic data communication with controller 202 and voltage transducers 252 via a plurality of electrical conduits 254, 256, and 258. Alternatively, PLL regulator 400 is configured to receive any number of voltage measurement signals from any number of voltage transducers 252, including, but not limited to, one voltage measurement signal from one voltage transducer 252. Controller 202 can also receive any number of current feedbacks from current transformers or current transducers that are electrically coupled to any portion of system 200 that facilitates operation of system 200 as described herein such as, for example, stator current feedback from stator bus 208, grid current feedback from generator side bus 236, and the like.

During operation, wind impacts blades 108 and blades 108 transform mechanical wind energy into a mechanical rotational torque that rotatingly drives low-speed shaft 112 via hub 110. Low-speed shaft 112 drives gearbox 114 that subsequently steps up the low rotational speed of shaft 112 to drive high-speed shaft 116 at an increased rotational speed. High speed shaft 116 rotatingly drives rotor 122. A rotating magnetic field is induced within rotor 122 and a voltage is induced within stator 120 that is magnetically coupled to rotor 122. Generator 118 converts the rotational mechanical energy to a sinusoidal, three-phase alternating current (AC) electrical energy signal in stator 120. The associated electrical power is transmitted to main transformer 234 via bus 208, switch 206, bus 216, breaker 214 and bus 236. Main transformer 234 steps up the voltage amplitude of the electrical power and the transformed electrical power is further transmitted to a grid via bus 240, circuit breaker 238 and bus 242.

In the doubly-fed induction generator configuration, a second electrical power transmission path is provided. Electrical, three-phase, sinusoidal, AC power is generated within wound rotor 122 and is transmitted to assembly 210 via bus 212. Within assembly 210, the electrical power is transmitted to rotor filter 218 wherein the electrical power is modified for the rate of change of the PWM signals associated with converter 220. Converter 220 acts as a rectifier and rectifies the sinusoidal, three-phase AC power to DC power.

The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to power converter 222 wherein converter 222 acts as an inverter configured to convert the DC electrical power from DC link 244 to three-phase, sinusoidal AC electrical power with pre-determined voltages, currents, and frequencies. This conversion is monitored and controlled via controller 202. The converted AC power is transmitted from converter 222 to bus 216 via buses 227 and 225, line contactor 226, bus 230, circuit breaker 228, and bus 232. Line filter 224 compensates or adjusts for harmonic currents in the electric power transmitted from converter 222. Stator synchronizing switch 206 is configured to close such that connecting the three-phase power from stator 120 with the three-phase power from assembly 210 is facilitated.

Circuit breakers 228, 214, and 238 are configured to disconnect corresponding buses, for example, when current flow is excessive and can damage the components of the system 200. Additional protection components are also provided, including line contactor 226, which may be controlled to form a disconnect by opening a switch (not shown in FIG. 2) corresponding to each of the lines of the line bus 230.

Assembly 210 compensates or adjusts the frequency of the three-phase power from rotor 122 for changes, for example, in the wind speed at hub 110 and blades 108. Therefore, in this manner, mechanical and electrical rotor frequencies are decoupled and the electrical stator and rotor frequency matching is facilitated substantially independently of the mechanical rotor speed.

Under some conditions, the bi-directional characteristics of assembly 210, and specifically, the bi-directional characteristics of converters 220 and 222, facilitate feeding back at least some of the generated electrical power into generator rotor 122. More specifically, electrical power is transmitted from bus 216 to bus 232 and subsequently through circuit breaker 228 and bus 230 into assembly 210. Within assembly 210, the electrical power is transmitted through line contactor 226 and busses 225 and 227 into power converter 222. Converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to power converter 220 wherein converter 220 acts as an inverter configured to convert the DC electrical power transmitted from DC link 244 to a three-phase, sinusoidal AC electrical power with pre-determined voltages, currents, and frequencies. This conversion is monitored and controlled via controller 202. The converted AC power is transmitted from converter 220 to rotor filter 218 via bus 219 is subsequently transmitted to rotor 122 via bus 212. In this manner, generator power control is facilitated.

Assembly 210 is configured to receive control signals from controller 202. The control signals are based on sensed conditions or operating characteristics of wind turbine 100 and system 200 as described herein and used to control the operation of the power conversion assembly 210. For example, tachometer 204 feedback in the form of sensed speed of the generator rotor 122 may be used to control the conversion of the output power from rotor bus 212 to maintain a proper and balanced three-phase power condition. Other feedback from other sensors also may be used by system 200 to control assembly 210 including, for example, stator and rotor bus voltages and current feedbacks. Using this feedback information, and for example, switching control signals, stator synchronizing switch control signals and system circuit breaker control (trip) signals may be generated in any known manner.

Power converter assembly 210 and generator 118 may be susceptible to grid voltage fluctuations and other forms of grid faults. Generator 118 may store magnetic energy that can be converted to high currents when a generator terminal voltage decreases quickly. Those currents can mitigate life expectancies of components of assembly 210 that may include, but not be limited to, semiconductor devices such as the IGBTs within converters 220 and 222. Similarly, during an islanding event, generator 118 becomes disconnected from the grid. Components that comprise the electrical system 200 such as busses 208, 216, 232, 230, 236, 240 can store energy that is released during an islanding event. This can result in an overvoltage on the electrical system 200 that connects the generation unit 118 with the grid. An overvoltage can be a short-term or longer duration increase in the measured voltage of the electrical system over its nominal rating. For example, the overvoltage may be 1%, 5% 10%, 50%, 150% or greater, and any values therebetween, of the measured voltage over the nominal voltage. Another challenge presented to the electrical system 200 during an islanding event is that converter 210 and generator 118 may experience an extremely high impedance grid and will most likely have almost no ability to export real power. If the turbine is operating at a significant power level, that energy must be consumed, and there is a tendency for that energy to find its way into the DC link 244 that couples the two converters 220, 222, as described below. This power flow can occur into the DC link 244 by the power semiconductors (not shown in FIG. 2) of either the line 222 or rotor converter 220. For systems similar to the one shown in FIG. 2, the use of a crowbar circuit, as known in the art, at the terminal of the rotor converter 220 may be used to protect the power semiconductors in many events, but the application of the crowbar during an islanding event may increase the risk of damage.

As noted above, overvoltage on the AC side of line side converter 222 can cause energy to be pumped into capacitors 250, thereby increasing the voltage on the DC link 244. The higher voltage on the DC link 244 can damage power semiconductors such as one or more electronic switches such as a gate turn-off (GTO) thyristor, gate-commutated thyristor (GCT), insulated gate bipolar transistor (IGBT), MOSFET, combinations thereof, and the like located within the line side converter 222 and/or rotor converter 220.

Figure 3A:
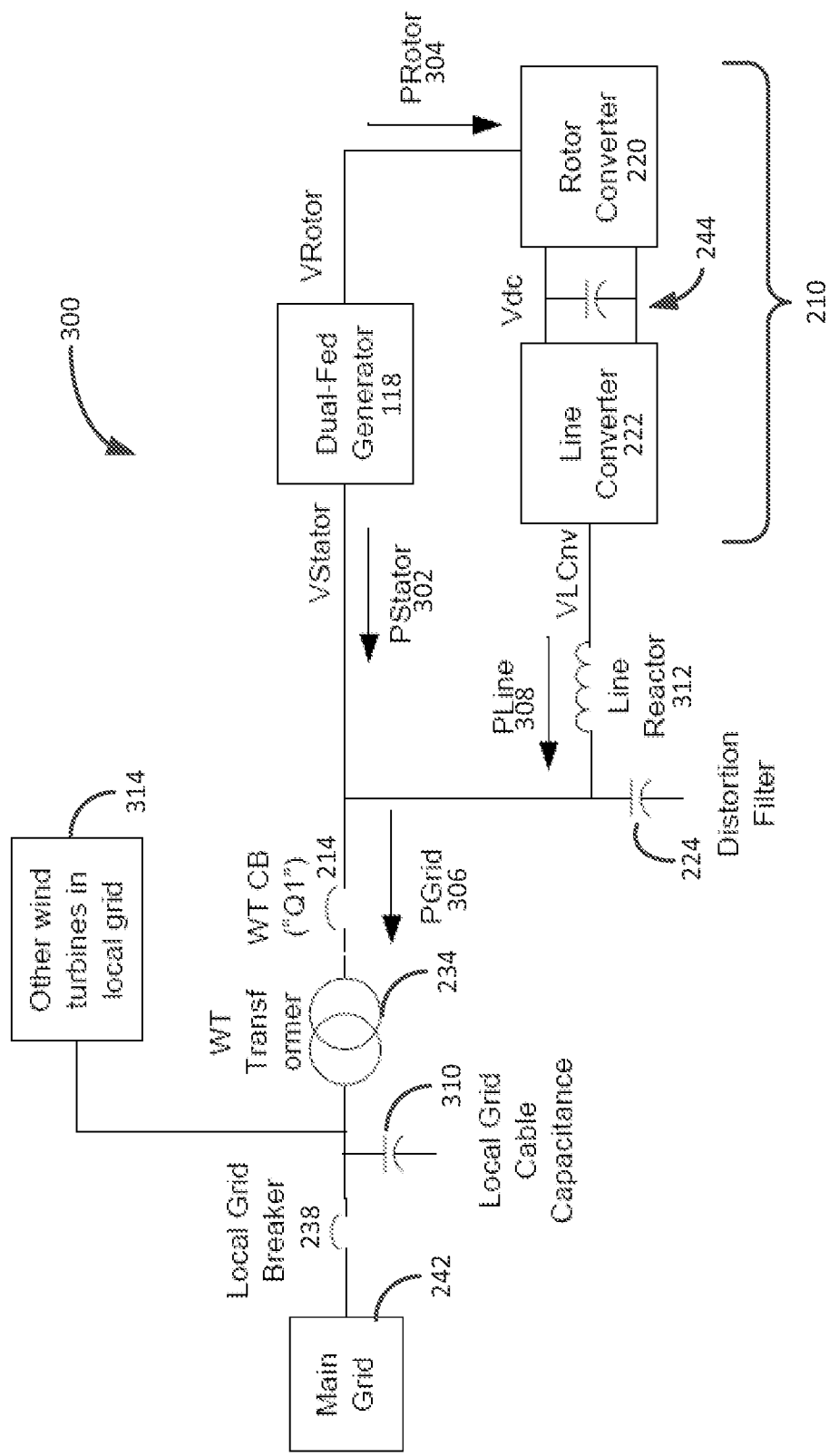
FIG. 3A illustrates the normal operating condition of a wind turbine in a wind park.

The normal operating condition of a wind turbine in a wind park is illustrated in FIG. 3A. This figure shows power flows within the converter 210 and the wind park electrical system 300 during super-synchronous operation typical of moderate to high wind conditions. The power from the generator 118 splits in two paths, one power flow (PStator) 302 flows directly from the stator 120 into the grid connection 242, the other power flow (PRotor) 304 via the rotor 122 which passes though the rotor converter 220, to the dc link 244, to the line converter 222, through a line reactor 312 (not required) and then on to the grid connection point 242. The sum (Pgrid) 306 of these two power flows 302, 304 are the net output of the generator 118. Note that the split of power between the generator rotor 122 and stator 120 is a function of rotor speed relative to synchronous. Similarly, power from other wind turbines 314 in the wind park flows from the local grid to the grid connection point 242. At super-synchronous operation the rotor speed is higher than synchronous and the power splits as shown. At sub-synchronous operation the rotor speed is less than synchronous and the rotor winding 122 draws power from the rotor converter 220, i.e. the power flow through the converters 222, 220.

Figure 3B:
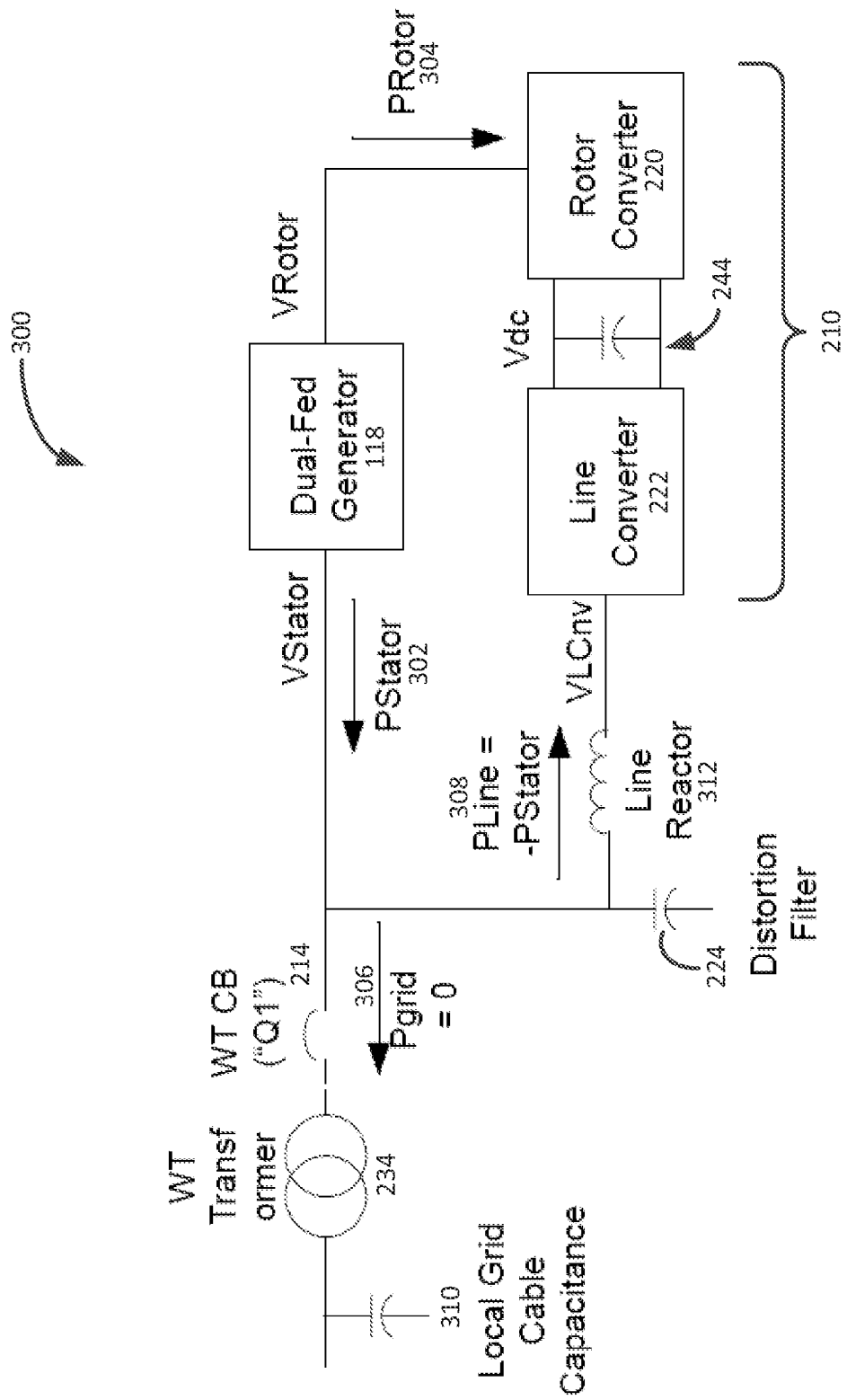
FIG. 3B illustrates the conditions when a remote breaker opens leaving the wind park in an islanded condition and the power flow to the grid is suddenly interrupted for a case where the rotor torque and speed remain the same as pre-islanding condition.

FIG. 3B illustrates the conditions when a remote breaker opens leaving the wind park in an islanded condition and the power flow to the grid 242 is suddenly interrupted for a case where the rotor torque and speed remain the same as pre-islanding condition. The power (PLine) 308 on the line converter 222 is suddenly forced to reverse, since the power that was flowing from the stator 120 to the grid 242 now has only the line converter 222 as a path. This causes the voltage on the dc link 244 to rise very rapidly. When an islanded condition occurs, it is desirable to disconnect the wind turbine 118 from the grid 242 in a manner that does not cause damage to components of the electrical system 300. However, damage to components can happen in a few milliseconds, which is typically faster than circuit breakers can operate. Control action is needed quickly to prevent damaging voltage levels. Also, as described above, the remote breaker opening may leave some portion of the local grid connected to the generator 118, e.g. cables that make up the wind park collector system, etc. This capacitance 310 can be a source of ac voltage amplification on the remaining network.

Figure 4:
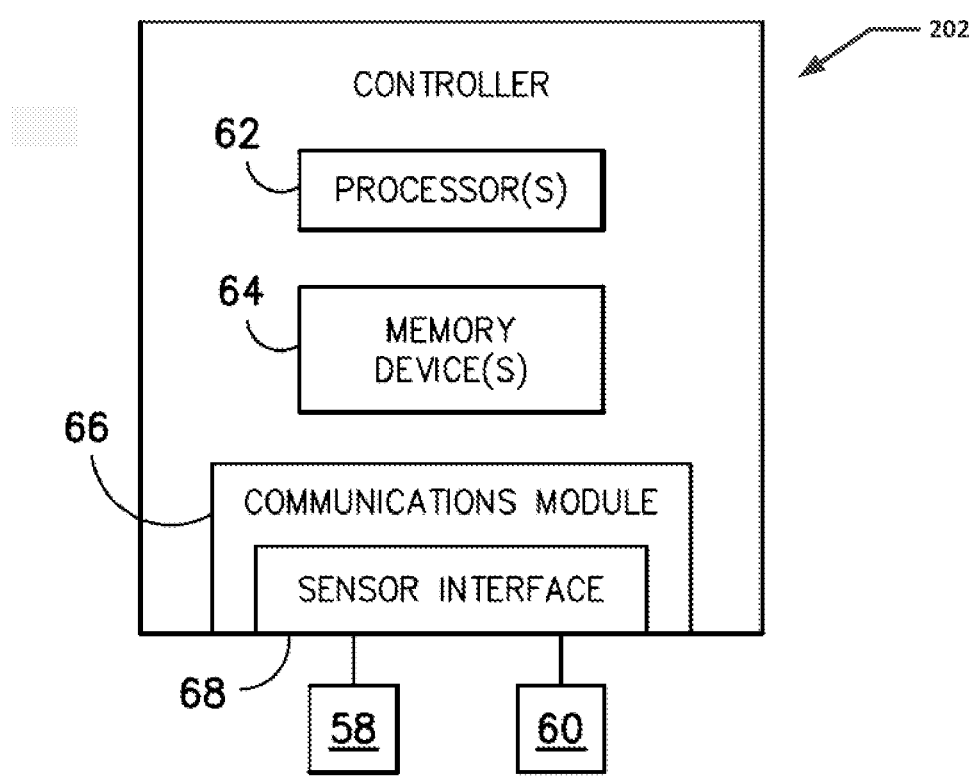
FIG. 4 illustrates a block diagram of one embodiment of suitable components that may be included within an embodiment of a controller, or any other computing device that receives signals indicating a high-voltage grid event in accordance with aspects of the present subject matter.

Referring now to FIG. 4, as noted above, some embodiments of systems for responding to a high-voltage grid event on an electrical system connected with one or more DFIGs can include a control system or controller 202. In general, the controller 202 may comprise a computer or other suitable processing unit. Thus, in several embodiments, the controller 202 may include suitable computer-readable instructions that, when implemented, configure the controller 202 to perform various different functions, such as receiving, transmitting and/or executing control signals. As such, the controller 202 may generally be configured to control the various operating modes (e.g., conducting or non-conducting states) of the one or more switches and/or components of embodiments of the electrical system 200. For example, the controller 200 may be configured to implement methods of responding to a high-voltage grid event on an electrical system connected with one or more DFIGs.

FIG. 4 illustrates a block diagram of one embodiment of suitable components that may be included within an embodiment of a controller 202, or any other computing device that receives signals indicating grid conditions in accordance with aspects of the present subject matter. In various aspects, such signals can be received from one or more sensors or transducers 58, 60, or may be received from other computing devices (not shown) such as a supervisory control and data acquisition (SCADA) system, a turbine protection system, PLL regulator 400 (FIG. 2) and the like. Received signals can include, for example, voltage signals such as DC bus 244 voltage and AC grid voltage along with corresponding phase angles for each phase of the AC grid, current signals, power flow (direction) signals, power output from the converter system 210, total power flow into (or out of) the grid, and the like. In some instances, signals received can be used by the controller 202 to calculate other variables such as changes in voltage phase angles over time, and the like. As shown, the controller 202 may include one or more processor(s) 62 and associated memory device(s) 64 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 64 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 64 may generally be configured to store suitable computer-readable instructions that, when implemented by the processor(s) 62, configure the controller 202 to perform various functions including, but not limited to, directly or indirectly transmitting suitable control signals to one or more switches that comprise the bi-directional power conversion assembly 210, monitoring operating conditions of the electrical system 200, and various other suitable computer-implemented functions.

Additionally, the controller 202 may also include a communications module 66 to facilitate communications between the controller 202 and the various components of the electrical system 200 and/or the one or more sources of electrical generation 118. For instance, the communications module 66 may serve as an interface to permit the controller 202 to transmit control signals to the bi-directional power conversion assembly 210 and/or other components of the wind turbine and electrical system. Moreover, the communications module 66 may include a sensor interface 68 (e.g., one or more analog-to-digital converters) to permit signals transmitted from the sensors (e.g., 58, 60) to be converted into signals that can be understood and processed by the processors 62. Alternatively, the controller 202 may be provided with suitable computer readable instructions that, when implemented by its processor(s) 62, configure the controller 202 to take various actions depending upon the control mode of the wind turbine. For example, in normal operation (i.e., rotor control), the rotor converter has dominant control over the flow of real and reactive power from the generator. The line converter acts primarily to regulate dc link voltage by adjusting the real power exchange to the grid connection point. The line converter can also draw reactive current from the grid in case of high ac voltage.

Figure 5A:
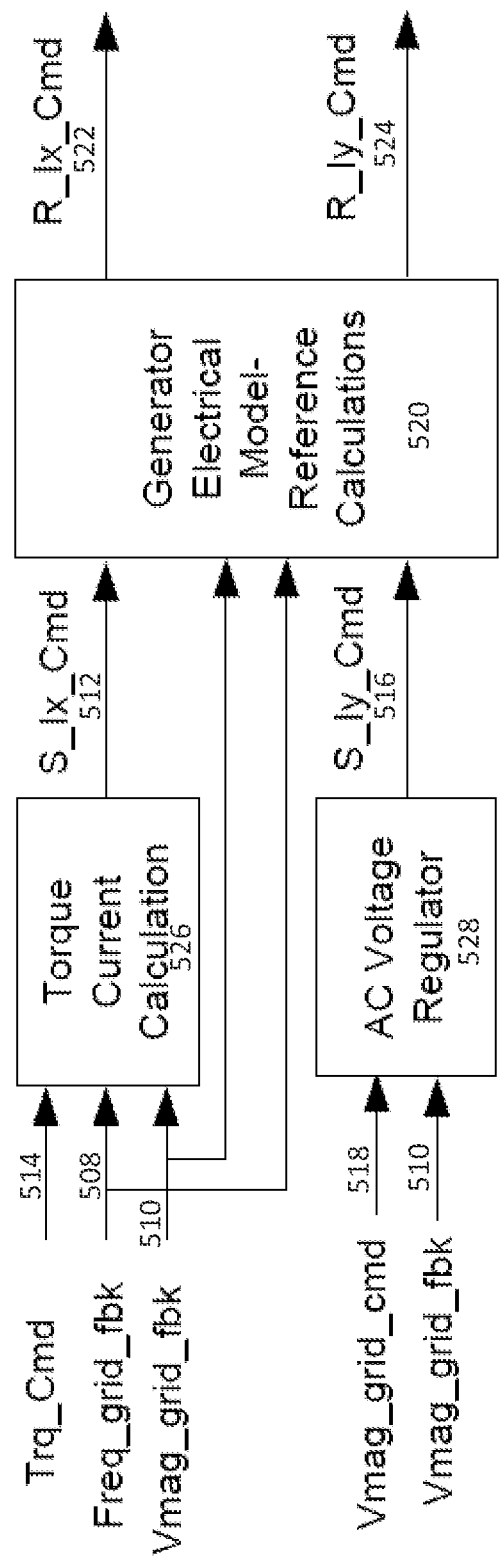
FIG. 5A is a control diagram of the main elements of the rotor control showing the functions that create commands for rotor current.
Figure 5B:
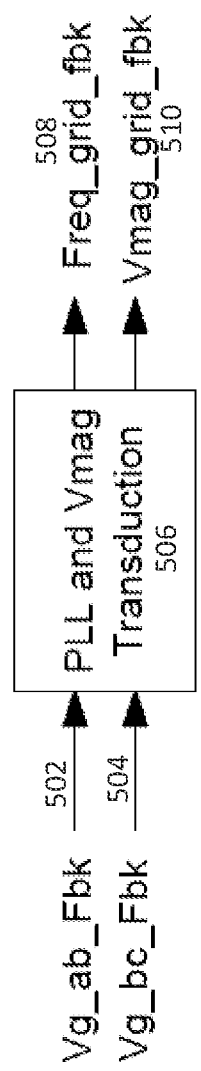
FIG. 5B is a control diagram for determining the frequency and magnitude of the positive-sequence voltage phasor of the grid voltage.
Figure 5C:
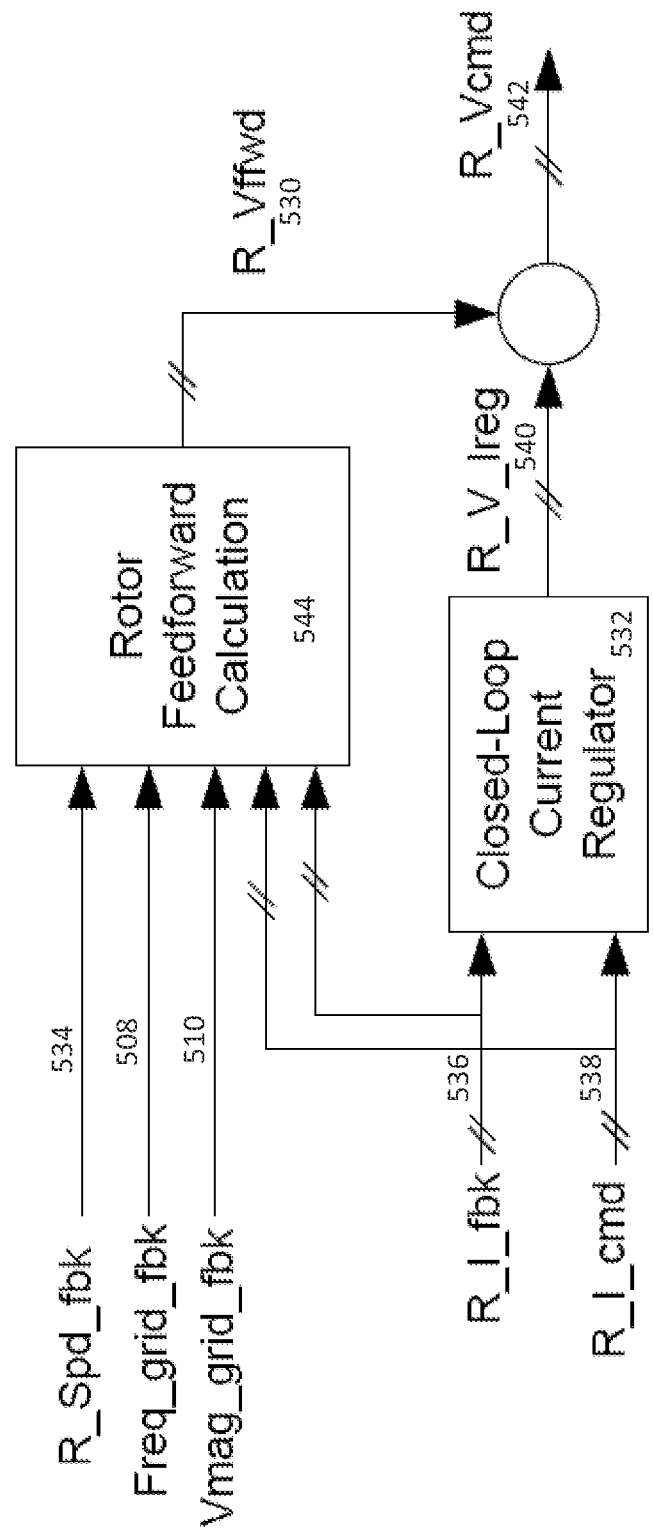
FIG. 5C is a control diagram showing the functions that implement commands for rotor current.

FIG. 5A is a control diagram of the main elements of the rotor control showing the functions that create commands for rotor current. The controller 202 as shown in FIG. 4 can be used to implement the steps of rotor control. The steps include the following: (1) referring to FIG. 5B, a control diagram for determining the frequency and magnitude of the positive-sequence voltage phasor of the grid voltage, detect grid voltage on at least two phases (e.g., Vg_ab_Fbk 502 and Vg_bc_Fbk 504) and derive via a phase-locked loop (PLL) and vector calculations 506 the frequency (Freq_grid_fbk 508) and magnitude (Vmag_grid_fbk 510) of the positive-sequence voltage phasor. This PLL also establishes the reference frame for vector quantities that are in-phase with ac voltage ("x" axis) and orthogonal to ac voltage ("y" axis)—it is to be appreciated that other vector references such as direct and quadrature ("d" and "q") may be used without limiting the scope of embodiments of the present invention; (2) referring back to FIG. 5A, calculate the torque producing (e.g., x-axis) stator current (S_Ix_Cmd 512) needed to create the torque that is commanded from a higher-level control function in the wind turbine (Trq_Cmd 514); (3) calculate the flux producing (e.g., y-axis) stator current (S_Iy_Cmd 516) needed to create the reactive current that is commanded from a higher-level control function in the wind turbine (Vmag_grid_cmd 518) and magnitude (Vmag_grid_fbk 510) of the positive-sequence voltage phasor; and (4) calculate, using an electric-circuit model 520 of the generator, the rotor-current commands (R_Ix_Cmd 522, R_Iy_Cmd 524) required to create the desired stator-currents (S_Ix_Cmd 512, S_Iy_Cmd 516). As shown in FIG. 5A, calculations can be performed by modules (e.g., Torque Current Calculation 526, AC Voltage Regulator 528) within the controller 202 or other suitable computing devices, or as stand-alone components. FIG. 5C is a control diagram showing the functions that implement commands for rotor current. This is a predictor-corrector structure with two steps: (1) calculate, using an electric-circuit model of the generator, the rotor-voltage "feed-forward" commands (R_Vx_ffwd, R_Vy_ffwd; note that in FIG. 5C, for clarity, lines with hashes "//" imply two-dimension variables (i.e., x, y both implied), therefore R_Vx_ffwd and R_Vy_ffwd are shown only as the signal R_Vffwd 530 on FIG. 5C) that would produce the desired rotor-currents (R_Ix_Cmd 522, R_Iy_Cmd 524, shown as R_I_cmd 538 in FIG. 5C) given a perfect electrical model, perfect feedback signals (e.g. rotor speed feedback (R_Spd_fbk 534), rotor current feedback (x and y) (R_I_fbk 536), and perfect implementation of the voltage commands 540, 542; and (2) correct, using a closed-loop regulator 532, for the imperfections of the predictor step. This closed-loop portion is designed to work when the generator is connected to the grid. A further action of the rotor control is to command zero voltage on the rotor ("crowbar") if dc link voltage exceeds a setpoint. This action is sometimes needed in response to severe grid faults close to the wind turbine (reference, for example, U.S. Pat. No. 7,321,221 issued Jan. 22, 2008; and U.S. Pat. No. 6,921,985 issued Jul. 26, 2005, both of which are fully incorporated by reference herein and made a part hereof). As shown in FIG. 5C, calculations can be performed by modules (e.g., Rotor Feedforward Calculation 544, Closed-Loop Current Regulator 532) within the controller 202 or other suitable computing devices, or as stand-alone components.

In normal control, as described above, when a sudden high-voltage grid event occurs, the following happens: (1) the high-level commands for voltage and torque do not change substantially, because they are the result of slower-acting control; (2) the line converter 222 reacts to high dc voltage by increasing the command for real current it injects to the grid; (3) the line converter 222 reacts to high ac voltage by drawing reactive current from the grid; (4) the ac voltage regulator 528 reacts to command increased reactive current drawn from the grid via the generator stator 120; (5) the torque calculator 526 reduces the amount of real current commanded by inverse proportion to the increase in grid voltage, which results in the same torque and real power from the generator 118; (6) the rotor current regulator 542 determines a predicted rotor voltage to achieve the desired current, and a closed-loop response to correct when measured current does not follow commanded current; (7) if the dc link voltage exceeds a crowbar threshold, then the rotor converter 220 will override the regulators and apply a short to the rotor 122; and (8) if a protective trip is commanded, both line and rotor converter 222, 220 gating is blocked simultaneous with issuing a command to open the wind turbine circuit breaker 214.

With exception of the crowbar action (step 7, above), the above steps are all in a correct direction when there remains some connection by the one or more DFIGs 118 to the grid.

Activating the crowbar in this condition may aggravate the voltage and current stresses on the electrical components of the wind turbine converter 210. Should the grid be completely disconnected from the one or more DFIGs 118, as a result of the fault clearing or other action, then the closed-loop portion 532 of the rotor current regulator 542 can act incorrectly. This is because the response of rotor current to rotor voltage commands will be drastically different, and likely of opposite sign, to the response when connected to the grid. An additional aspect relates to crowbar action when the grid is disconnected. This can create a situation where any capacitance 310 on the remaining portion of the ac grid will resonate with the inductance of the generator 118, leading to a voltage amplification that can quickly lead to damaging levels of stress on electrical components. Another aspect relates to the response of the line converter 222. This converter 222 can lose control of its current should the rise in ac voltage exceed the rise in dc voltage by more than a certain amount. Since one objective is to hold the dc link voltage to within its capability, there is a limit of ac voltage rise beyond which the line converter 222 can continue to remove energy from the dc link 244. A final aspect relates to the response on protective trip action. Blocking the line 222 and rotor converter 220 while still connected to the grid will not remove energy from the system, but rather allow the energy in the grid, or capacitance 310 of the remaining collector and transmission system, to flow uncontrolled into the wind converter 210 with possible voltage increases beyond equipment capability.

Therefore, a different control response different from normal operation is needed for high-voltage grid events. The objectives of changing the control response are to reduce the power injected into the dc link 244 from the generator rotor 122 to approximately zero as a way of preventing excessive dc voltage rise. This action also allows the line 222 and rotor converters 220 to utilize their full capability for holding down ac voltage on the generator stator 120. Another objective of changing the control response is to lower the effective internal voltage of the generator 118 as seen from the stator 120 as a way to reduce voltage on the stator 120. Yet another objective is to lower the voltage of the line converter 222 to aid the generator 118 in lowering the stator voltage. And a final objective is to ensure that the converters 210 operate within the voltages and currents that are possible given the circuit conditions, to prevent protective actions (e.g. crowbar or overcurrent blocking) from interfering with meeting the desired control objectives.

Figure 6A:
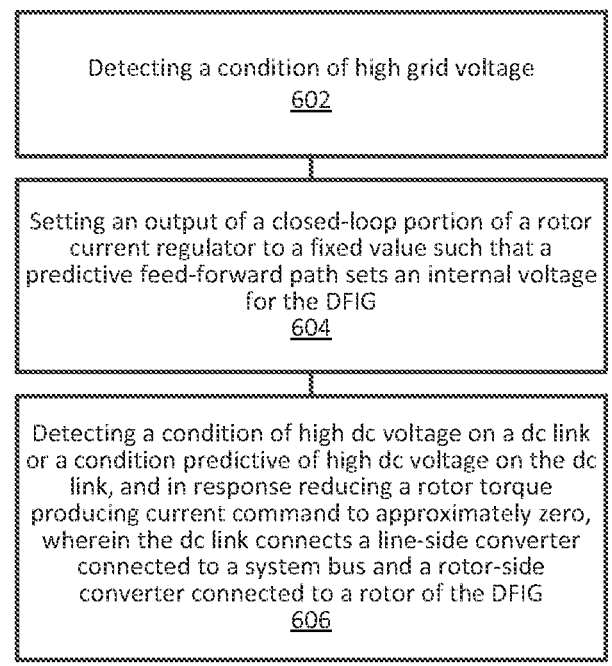
FIG. 6A is a flowchart illustrating an embodiment of a method of controlling a dual-fed induction generator (DFIG) during a high-voltage grid event.

Realizing these objectives can be achieved in several ways, an embodiment of an approach is described below for responding to high-voltage grid events that builds upon the normal control structure. FIG. 6A is a flowchart illustrating an embodiment of a method of controlling a dual-fed induction generator (DFIG) during a high-voltage grid event. Embodiments of steps of the method described in FIG. 6 can be performed by one or more computing devices such as controller 202. At step 602, a condition of high grid voltage is detected. An overvoltage can be a short-term or longer duration increase in the measured voltage of the electrical system over its nominal rating. For example, the overvoltage may be 1%, 5% 10%, 50%, 150% or greater, and any values therebetween, of the measured voltage over the nominal voltage. In one aspect, a threshold can be set for the overvoltage above which a high-voltage grid event is signaled. At step 604, an output of a closed-loop portion of the rotor current regulator is set to a fixed value. In one aspect, the fixed value is zero or approximately zero. In this way, the predictive feed-forward path as described above is relied on as a convenient means of setting the generator internal voltage according to control objectives, as described above. At step 606, a condition of high dc voltage, or a condition that will soon lead to high dc voltage condition such as, for example, high ac voltage, is detected and the rotor torque producing current command is reduced to approximately zero. In one aspect, this can be done by overriding the rotor current command after the normal logic flow, or by using the existing control structure and reducing the torque command. A combination may be used to achieve rapid response followed by smooth transition.

Following the above-described control response to a high-voltage grid event, should the grid return to a condition where there remains a viable electrical connection between the wind turbine and the grid, then the control transitions back to normal mode. The following steps are performed: (1) detect resumption of grid connection, with a grid voltage within the capability of the wind turbine. This involves at least a measure of grid voltage at the wind turbine. It may also involve measurements of the current flowing out of the wind turbine; (2) precondition upstream regulators as appropriate to provide a bumpless transition to normal control; and (3) switch (back) to normal control mode.

If, following the above-described control response to a high-voltage grid event, it is determined that the grid is disconnected from the wind turbine, the following steps are performed: (1) detect that the grid connections have all been lost, leaving the wind plant in an islanded condition. There are several ways to do this including, for example, standard wind turbine monitor and protection functions, including grid frequency deviation, grid voltage deviation, measured torque not following commanded torque for a predetermined time, turbine overspeed, tower vibration, etc. Another way of detecting that grid connections have been lost includes special monitoring functions enacted by the high-voltage condition, e.g. increasing the sensitivity of existing functions such as frequency and voltage deviations. And yet another way of detecting loss of grid connections includes receiving a signal from an external device that knows status of the grid connections. Once loss of grid connections is determined, then (2) a command is issued to open wind turbine circuit breaker; (3) the status of wind turbine circuit breaker is determined after issuing the open command; and (4) after it is determined that the wind turbine circuit breaker has opened, gating the converters is stopped as part of an orderly shutdown process.

In one aspect, should a protective trip be required, the converters are gated following the above strategy until the wind turbine circuit breaker clears the connection to the remaining portion of the grid. The above-described mode of operation remains in effect until either the grid conditions are determined to be in a connected mode where ride-through is possible, or a decision is made to stop the wind turbine.

Figure 6B:
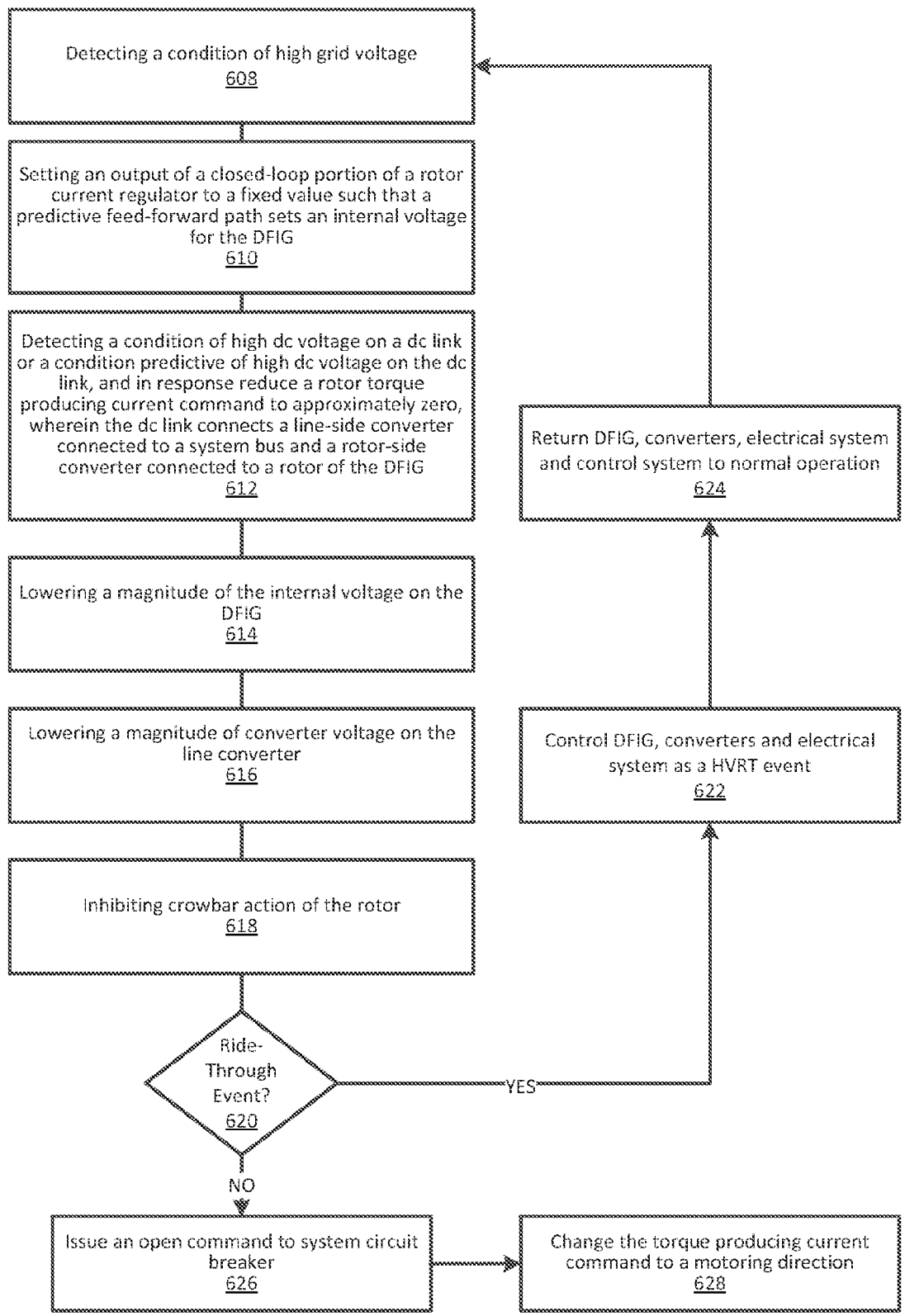
FIG. 6B is a flowchart illustrating another embodiment of a method of controlling a dual-fed induction generator (DFIG) during a high-voltage grid event.

FIG. 6B is a flowchart illustrating another embodiment of a method of controlling a dual-fed induction generator (DFIG) during a high-voltage grid event. Embodiments of steps of the method described in FIG. 6 can be performed by one or more computing devices such as controller 202. At step 608, a condition of high grid voltage is detected. An overvoltage can be a short-term or longer duration increase in the measured voltage of the electrical system over its nominal rating. For example, the overvoltage may be 1%, 5% 10%, 50%, 150% or greater, and any values therebetween, of the measured voltage over the nominal voltage. In one aspect, a threshold can be set for the overvoltage above which a high-voltage grid event is signaled. At step 610, an output of a closed-loop portion of the rotor current regulator is set to a fixed value. In one aspect, the fixed value is zero or approximately zero. In this way, the predictive feed-forward path as described above is relied on as a convenient means of setting the generator internal voltage according to control objectives, as described above. At step 612, a condition of high dc voltage, or a condition that will soon lead to high dc voltage condition such as, for example, high ac voltage, is detected and the rotor torque producing current command is reduced to approximately zero. In one aspect, this can be done by overriding the rotor current command after the normal logic flow, or by using the existing control structure and reducing the torque command. A combination may be used to achieve rapid response followed by smooth transition. At step 614, the magnitude of the internal voltage on the generator is lowered. Generally, this can be accomplished by reducing air-gap flux in the generator. In one aspect, this is performed by moving the rotor flux producing (e.g., y-axis) command to the under excited region. Use of the existing feed-forward path is a means to set this current command in a manner that can prevent overcurrent blocking. The logic in the final rotor gating calculation can limit the voltage request to keep the rotor converter within its linear control range. At step 616, the magnitude of converter voltage on the line converter is lowered. In one aspect, this is performed by moving the line converter flux producing current command, while limiting the command so that overcurrent blocking does not occur. At step 618, crowbar action may be inhibited for electrical conditions for which the electrical system can continue without damage. In one aspect, crowbar action is blocked. In other aspects, crowbar action can be available but de-sensitized as crowbar action may still be prudent if the stress levels become too high, as a means to reduce the extent of possible damage to electrical components. At step 620, it is determined whether the high-voltage grid event is an event that the DFIG can ride through. Generally, this will involve a high-voltage condition where the DFIG remains connected with the grid. If it is determined that the condition is a high-voltage ride through (HURT) event, then the process goes to step 622 where the DFIG, converters and electrical system are controlled as described above or in accordance with U.S. Patent Publication U.S. 20120133343 A1 (application Ser. No. 13/323,309) filed Dec. 12, 2011, which is fully incorporated by reference and made a part hereof. Following the above-described control response to a high-voltage grid event, should the grid return to a condition where there remains a viable electrical connection between the wind turbine and the grid, then the process goes to step 624 and control transitions back to normal mode. The following steps may be performed in the transition back to normal mode: (1) detect resumption of grid connection, with a grid voltage within the capability of the wind turbine. This involves at least a measure of grid voltage at the wind turbine. It may also involve measurements of the current flowing out of the wind turbine; (2) precondition upstream regulators as appropriate to provide a bumpless transition to normal control; and (3) switch (back) to normal control mode. The process then returns to step 608 to monitor for a high grid voltage. Returning to step 620, as noted above determining whether the event is a ride-through event or not generally involved determining whether the DFIG remains connected to the grid, or not. If, following the above-described control response to a high-voltage grid event, it is determined that the grid is disconnected from the wind turbine, the following steps are performed: (1) detect that the grid connections have all been lost, leaving the wind plant in an islanded condition. There are several ways to do this including, for example, standard wind turbine monitor and protection functions, including grid frequency deviation, grid voltage deviation, measured torque not following commanded torque for a predetermined time, turbine overspeed, tower vibration, etc. Another way of detecting that grid connections have been lost includes special monitoring functions enacted by the high-voltage condition, e.g. increasing the sensitivity of existing functions such as frequency and voltage deviations. And yet another way of detecting loss of grid connections includes receiving a signal from an external device that knows status of the grid connections. If it is determined at step 620 that the grid connection has been lost, then the process goes to step 626. At step 626, once loss of grid connections is determined, then a command is issued to open the wind turbine circuit breaker; the status of wind turbine circuit breaker is determined after issuing the open command; and after it is determined that the wind turbine circuit breaker has opened, gating the converters is stopped as part of an orderly shutdown process. In one aspect, as shown in step 628, concurrently with the command to open the wind circuit breaker or during the time the breaker is opening, the torque producing (e.g., x-axis) current command can be changed to a motoring direction to further remove energy from the electrical system including the DFIG, dc link (including any capacitors), line-side converter, rotor side converter, any remaining grid, and the like.

In one aspect, should a protective trip be required, the converters are gated following the above strategy until the wind turbine circuit breaker clears the connection to the remaining portion of the grid. The above-described mode of operation remains in effect until either the grid conditions are determined to be in a connected mode where ride-through is possible, or a decision is made to stop the wind turbine.

Figure 7:
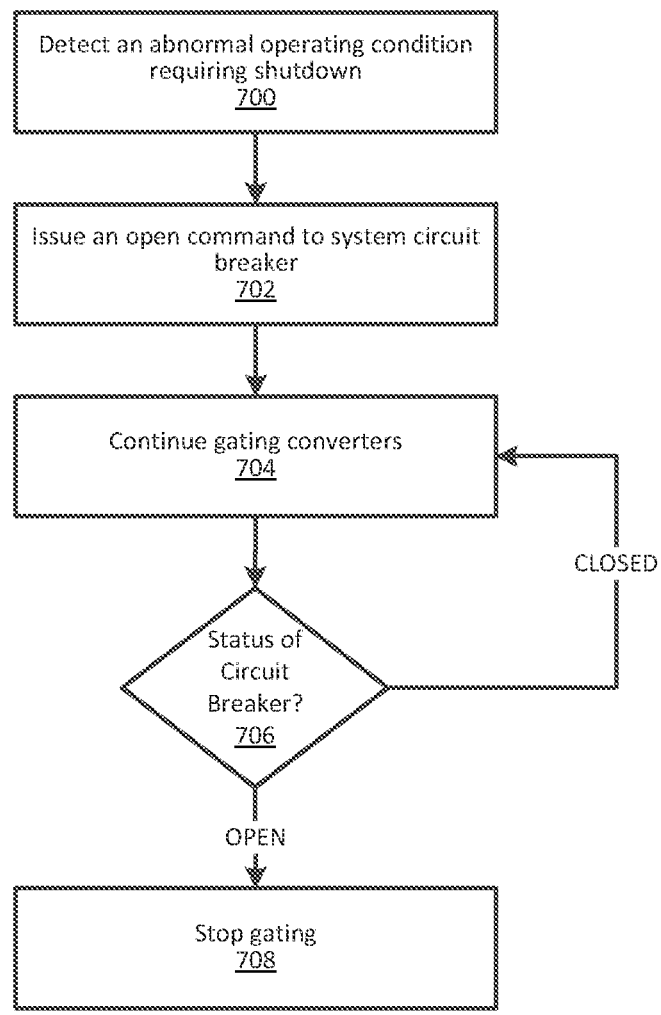
FIG. 7 is a flowchart illustrating an embodiment of a method for controlling wind turbine electrical components when opening a system breaker associated with a DFIG upon detection of a condition requiring shutdown.

In another embodiment, if a protective action is requested in any mode of wind turbine operation, then the process as described in the exemplary flowchart of FIG. 7 is performed for controlling wind turbine electrical components when opening a system breaker associated with a DFIG upon detection of a condition requiring shutdown. Steps of the process shown in FIG. 7 can be performed by a computing device such as controller 202. At step 700, an abnormal operating condition is detected in the electrical system that requires shutdown of the DFIG and con/or converters. At step 702, a command is issued to open wind turbine circuit breaker 214. This command can be issued based on any operational condition of the wind turbine, converters, and the like. At step 704, for both line and rotor converters 222, 220, gating is continued during and after issuing the command to open the wind turbine circuit breaker 214. Gating refers to causing electronic switches such as IGBTs and the like to fire or go to a conducting state for at least as long as they receive the gating signal. At step 706, the status of wind turbine circuit breaker is determined after issuing the open command. At step 708, if it is determined that the wind turbine circuit breaker has opened, gating the converters is stopped as part of an orderly shutdown process. If, at step 706, it is determined that the wind turbine circuit breaker has not opened, the process returns to step 704 and gating continues until the breaker opens or the trip command is rescinded. One benefit of continuing to gate the converters after the trip signal is issued is to allow the converters and generator to reduce the ac voltage that can be harmful to converter and turbine components.

As described above and as will be appreciated by one skilled in the art, embodiments of the present invention may be configured as a system, method, or a computer program product. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable non-transitory computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as the processor(s) 62 discussed above with reference to FIG. 3, to produce a machine, such that the instructions which execute on the computer or other programmable data processing apparatus create a means for implementing the functions specified in the flowchart block or blocks.

These computer program instructions may also be stored in a non-transitory computer-readable memory that can direct a computer or other programmable data processing apparatus (e.g., processor(s) 62 of FIG. 3) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for controlling a dual-fed induction generator (DFIG) in response to a high-voltage grid event, said method comprising:
   implementing, by a controller, a feed-forward portion of a rotor current regulator to generate a feed-forward rotor voltage command;
   implementing, by the controller, a closed-loop portion of the rotor current regulator to generate a closed-loop rotor voltage command, the feed-forward rotor voltage command and the closed-loop rotor voltage command being used to generate an output rotor voltage command;
   setting, by the controller, the closed-loop rotor voltage command to a fixed value such that the feed-forward rotor voltage command sets an internal voltage for the DFIG; and
   detecting, by the controller, a condition of high dc voltage on a dc link or a condition predictive of high dc voltage on the dc link, and in response reducing a rotor torque producing current command to approximately zero, wherein the dc link connects a line-side converter connected to a system bus and a rotor-side converter connected to a rotor of the DFIG.

2. The method of claim 1, further comprising determining, by the controller, that the high-voltage grid event is not a ride-through event and issuing a trip command, by the controller, to a system circuit breaker to disconnect the DFIG, line-side converter and rotor-side converter from the grid.

3. The method of claim 2, further comprising changing the torque producing current command to a motoring direction in order to remove energy from at least the DFIG, dc link, rotor converter and the line converter.

4. The method of claim 1, wherein setting, by the controller, the closed-loop rotor voltage command to a fixed value such that the feed-forward rotor voltage command sets an internal voltage for the DFIG comprises setting the closed-loop rotor voltage command to zero.

5. The method of Claim 1, wherein detecting, by the controller, the condition of high dc voltage on the dc link or the condition predictive of the high dc voltage condition on the dc link, and in response reduce the rotor torque producing current command to approximately zero comprises the controller overriding a rotor current command after a normal logic flow, using an existing control structure and reducing a rotor torque command, or a combination of both.

6. The method of claim 1, further comprising:
lowering, by the controller, a magnitude of the internal voltage on the DFIG;
lowering, by the controller, a magnitude of converter voltage on the line converter; and
inhibiting, by the controller, crowbar action of the rotor.

7. The method of claim 6, wherein lowering, by the controller, the magnitude of the internal voltage on the generator comprises moving a rotor flux producing current command to an under excited region.

8. The method of claim 7, wherein the feed-forward rotor voltage command is used to set the rotor flux producing current command in a manner that prevents overcurrent blocking.

9. The method of claim 6, Wherein lowering, by the controller, the magnitude of converter voltage on the line converter comprises moving a line converter flux producing current command while limiting the command so that overcurrent blocking does not occur.

10. A system for controlling a dual-fed induction generator (DFIG) in response to a high-voltage grid event, said system comprising:
a controller, wherein the controller is configured to detect a condition of high grid voltage;
a line-side converter connected to a system bus;
a rotor-side converter connected to a rotor of the DFIG, wherein the line-side converter and the rotor-side converter are connected by a direct current (dc) link, wherein said line-side converter and said rotor-side converter are communicatively coupled with the controller; and
said controller further comprising a rotor current regulator, the controller being configured to implement a feed-forward portion of the rotor current regulator to generate a feed-forward rotor voltage command and a closed-loop portion of the rotor current regulator to generate a closed-loop rotor voltage command, the feed-forward rotor voltage command and the closed-loop rotor voltage command being used to generate an output rotor voltage command,
wherein in response to the detected condition of high grid voltage, the closed-loop rotor voltage command is set to a fixed value such that the feed-forward rotor voltage command sets an internal voltage for the DFIG in response to said detected condition of high grid voltage, said controller further configured to:
detect a condition of high dc voltage on the dc link, or a condition predictive of high dc voltage on the dc link, and in response reduce a rotor torque producing current command to approximately zero.

11. The system of claim 10, wherein the controller is further configured to determine that the high-voltage grid event is not a ride-through event and issue a trip command to a system circuit breaker to disconnect the DFIG, line-side converter and rotor-side converter from the grid.

12. The system of claim 11, further comprising changing the torque producing current command to a motoring direction in order to remove energy from at least the DFIG, dc link, rotor converter and the line converter.

13. The system of claim 10, wherein the closed-loop rotor voltage command is set to zero.

14. The system of claim 10, wherein the controller configured to detect a condition of high dc voltage on the dc link, or a condition predictive of the high dc voltage condition on the dc link, and in response reduce the rotor torque producing current command to approximately zero comprises overriding a rotor current command after a normal logic flow, using an existing control structure and reducing a rotor torque command, or a combination of both.

15. The system of claim 10, wherein the controller is further configured to:
lower a magnitude of the internal voltage on the DFIG;
lower a magnitude of converter voltage on the line converter; and
inhibit crowbar action of the rotor.

16. The system of claim 15, wherein the controller configured to lower the magnitude of the internal voltage on the generator comprises moving a rotor flux producing current command to an under excited region.

17. The system of claim 16, wherein the feed-forward rotor voltage command is used to set the rotor flux producing current command in a manner that prevents overcurrent blocking.

18. The system of claim 15, wherein the controller configured to lower the magnitude of converter voltage on the line converter comprises moving a line converter flux producing current command while limiting the command so that overcurrent blocking does not occur.

19. A system for controlling a dual-fed induction generator (DFIG) in response to a high-voltage grid event, said system comprising:
one or more dual-fed induction generators (DFIGs) connected to an alternating current (ac) electric power system, wherein the ac electric power system is configured to transmit at least one phase of electrical power to the one or more DFIGs or to receive at least one phase of electrical power from the one or more DFIGs; and
a control system, wherein the control system is electrically coupled to at least a portion of the ac electric power system and at least a portion of the control system is coupled in electronic data communication with at least a portion of the one or more DFIGs, and wherein said control system comprises a controller and said controller is configured to:
detect a grid fault on the ac electric power system, wherein the controller configured to detect the grid fault on the ac electric system comprises the controller configured to detect whether the grid fault comprises a high voltage grid event;
implement a feed-forward portion of a rotor current regulator to generate a feed-forward rotor voltage command;
implement a closed-loop portion of the rotor current regulator to generate a closed-loop rotor voltage command;
in response to the detected high-voltage grid event, the controller is further configured to:
set the closed-loop rotor voltage command to a fixed value such that the feed-forward rotor voltage command sets an internal voltage for the DFIG;
detect a condition of high dc voltage on a dc link or a condition predictive of high dc voltage on the dc link, and in response reduce a rotor torque producing current command to approximately zero, wherein the dc link connects a line-side converter connected to a system bus and a rotor-side converter connected to a rotor of the DFIG;

lower a magnitude of the internal voltage on the DFIG;

lower a magnitude of converter voltage on the line converter; and inhibit crowbar action of the rotor.

20. The system of claim 19, further comprising determining, by the controller, that the high-voltage grid event is not a ride-through event and said controller:

issuing a trip command to a system circuit breaker to disconnect the DFIG, line-side converter and rotor-side converter from the grid; and changing the torque producing current command to a motoring direction in order to remove energy from at least the DFIG, dc link, rotor converter and the line converter.

\* \* \* \* \*